US011366562B2

(12) United States Patent
Verdugo et al.

(10) Patent No.: US 11,366,562 B2
(45) Date of Patent: *Jun. 21, 2022

(54) ONLINE ENGAGEMENT PLATFORM FOR VIDEO CREATORS

(71) Applicant: Google LLC, Mountain View, CA (US)

(72) Inventors: Renato Verdugo, New York, NY (US); Kiley McEvoy, Berkeley, CA (US); Shannon Butler, San Francisco, CA (US); Paul Heider, San Francisco, CA (US); Molly Nix, San Francisco, CA (US); Nicholas Jones, San Francisco, CA (US); Eric Mayers, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/141,203

(22) Filed: Jan. 4, 2021

(65) Prior Publication Data
US 2021/0124464 A1 Apr. 29, 2021

Related U.S. Application Data

(63) Continuation of application No. 15/382,353, filed on Dec. 16, 2016, now Pat. No. 10,884,570.

(51) Int. Cl.
G06F 3/0481 (2022.01)
G06F 3/04842 (2022.01)
(Continued)

(52) U.S. Cl.
CPC ........ *G06F 3/0481* (2013.01); *G06F 3/04842* (2013.01); *G06Q 50/01* (2013.01);
(Continued)

(58) Field of Classification Search
CPC .. G06F 3/0481; G06F 3/04842; G06F 40/134; G06F 40/166; G06Q 50/01; H04L 67/02
See application file for complete search history.

(56) References Cited

U.S. PATENT DOCUMENTS 9,489,454 B1\* 11/2016 Lewis ..................... G06F 16/40
2010/0058410 A1\* 3/2010 Rance ................ H04N 21/4788
725/109
(Continued)

OTHER PUBLICATIONS

PCT International Search Report and Written Opinion for International Application No. PCT/US2017!052893, dated Nov. 13, 2017, 14 pages.

*Primary Examiner* — Stephen S Hong
*Assistant Examiner* — Nicholas Hasty
(74) *Attorney, Agent, or Firm* — Lowenstein Sandler LLP

(57) ABSTRACT

A channel graphical user interface (GUI) of a content sharing platform is provided for presentation to a channel owner. A request is received, via the channel GUI, to enable an online community option that (i) facilitates an online conversation between the channel owner and a subset of viewers of the channel of the channel owner on the content sharing platform, and (ii) allows the channel owner to control viewer responses that are permitted during the online conversation. In response to the request of the channel owner to enable the online community option, the online community option is associated with the channel in a data store, and the channel GUI is modified, the modified channel GUI presenting an online community GUI element representing the online community option. Upon a selection of the online community GUI element representing the online community option by the channel owner, a post creation GUI is provided to allow the channel owner to submit a post to initiate the online conversation between the subset of viewers and the channel owner. In response to a selection of
(Continued)

the GUI element representing the online community option by a viewer of the channel in the channel GUI, providing the online community GUI comprising a title and a body of the post of the channel owner, and allowing the viewer of the channel to provide a permissible viewer response to the post of the channel owner.

23 Claims, 6 Drawing Sheets

(51) Int. Cl.
*G06Q 50/00* (2012.01)
*H04L 67/02* (2022.01)
*G06F 40/134* (2020.01)
*G06F 40/166* (2020.01)

(52) U.S. Cl.
CPC ............ *H04L 67/02* (2013.01); *G06F 40/134* (2020.01); *G06F 40/166* (2020.01)

(56) References Cited

U.S. PATENT DOCUMENTS

| | | |
|---|---|---|
| 2010/0250285 A1 | 9/2010 | Shelton |
| 2012/0102401 A1 | 4/2012 | Ijas et al. |
| 2012/0197651 A1 | 8/2012 | Robinson et al. |
| 2013/0260896 A1* | 10/2013 | Miura ................... A63F 13/795 463/42 |
| 2014/0215350 A1* | 7/2014 | Kosslyn ........... H04N 21/25866 715/745 |
| 2015/0195313 A1 | 7/2015 | Lewis et al. |
| 2015/0234887 A1* | 8/2015 | Greene ................. G06F 40/169 707/736 |
| 2015/0304369 A1 | 10/2015 | Sandholm et al. |

* cited by examiner

ONLINE ENGAGEMENT PLATFORM FOR VIDEO CREATORS

RELATED APPLICATIONS

This application is a continuation application of co-pending U.S. patent application Ser. No. 15/382,353, filed Dec. 16, 2016, which is herein incorporated by reference.

TECHNICAL FIELD

This disclosure relates to the field of online engagement platforms and, in particular, to an online engagement platform for video creators.

BACKGROUND

On the Internet, social media platforms (e.g., social network platforms, content sharing platforms, etc.) allow users to connect to and share information with each other. Many social media platforms include a content sharing aspect that allows users to upload, view, and share content, such as video content, image content, audio content, text content, and so on (which may be collectively referred to as "media items" or "content items"). Such media items may include audio clips, movie clips, TV clips, and music videos, as well as amateur content such as video blogging, short original videos, pictures, photos, other multimedia content, etc. Users may use computing devices (e.g., client devices such as smart phones, cellular phones, laptop computers, desktop computers, netbooks, tablet computers) to play and/or consume media items (e.g., watch digital videos, and/or listen to digital music).

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes receiving, from a processing device of a content sharing platform, a request of a channel owner to enable an online community option to facilitate communications between the channel owner and viewers of a channel of the channel owner on the content sharing platform; associating the online community option with the channel; providing a channel graphical user interface (GUI) comprising a GUI element representing the online community option for presentation to the channel owner; in response to a selection of the GUI element representing the online community option by the channel owner, providing an online community GUI to allow the channel owner to submit a post to initiate an online conversation between the viewers of the channel and the channel owner; providing the channel GUI comprising the GUI element representing the online community option for presentation to a viewer of the viewers of the channel; and in response to a selection of the GUI element representing the online community option by the viewer of the channel, providing the online community GUI comprising the post of the channel owner, and allowing the viewer of the channel to respond to the post of the channel owner.

In some implementations, providing the online community GUI to allow the channel owner to submit the post comprises: providing a post creation GUI comprising: a first GUI element to receive input of a post title; a second GUI element to receive input of a post body; and a third GUI element to receive input of a permissible response type.

In some implementations, the post creation GUI further comprises a fourth GUI element to receive input of a post attachment type. In some implementations, the method further includes receiving a response of the viewer to the post of the channel owner; and providing the response for display to the viewers and the channel owner. In some implementations the method further includes receiving a response of the viewer to the post of the channel owner; and providing the response for display to the channel owner but not other viewers.

In another aspect of the disclosure, a method includes receiving first input of a first user posting content on a social media platform, the first input specifying a permissible response type for future responses to the posted content, the permissible response type being selected from a plurality of response types by the first user; receiving the posted content provided by the first user; associating the permissible response type with the posted content in a data store; providing the posted content for display on the social media platform; receiving a first response of a second user to the posted content; determining, by a processing device, whether a response type of the first response corresponds to the permissible response type for the posted content from the data store; in response to determining that the response type of the first response corresponds to the permissible response type, providing, by the processing device, the first response for display on the social media platform; and in response to determining that the response type of the first response does not correspond to the permissible response type, preventing, by the processing device, the first response from being displayed on the social media platform.

In some implementations, the method further includes: in response to providing the posted content for display on the social media platform, sending a notification to a subset of members of the social media platform, the notification indicating that the posted content was displayed.

In some implementations, the first response is privately displayed to an account associated with the first user. In some implementations, the first response is publicly displayed to a plurality of members of the social media platform.

In some implementations, the method further includes: receiving a second response of a third user to the posted content; determining whether a response type of the second response corresponds to the permissible response type for the posted content from the data store; and in response to determining that the response type of the second response corresponds to the permissible response type, providing the second response for display on the social media platform, wherein the first response and the second response are displayed in a nondeterministic order.

In some implementations, the posted content comprises a link to a media item to be provided with the posted content. In some implementations, the permissible response type is a poll. In some implementations, the permissible response type is a ranked submission. In some implementations, the permissible response type is a comment. In some implementations, the permissible response type is a media item.

Computing devices for performing the operations of the above described methods and the various implementations described herein are disclosed. Computer-readable media that store instructions for performing operations associated with the above described methods and the various implementations described herein are also disclosed.

BRIEF DESCRIPTION OF THE DRAWINGS

The present disclosure is illustrated by way of example, and not by way of limitation, in the figures of the accompanying drawings.

DETAILED DESCRIPTION

Figure 1:
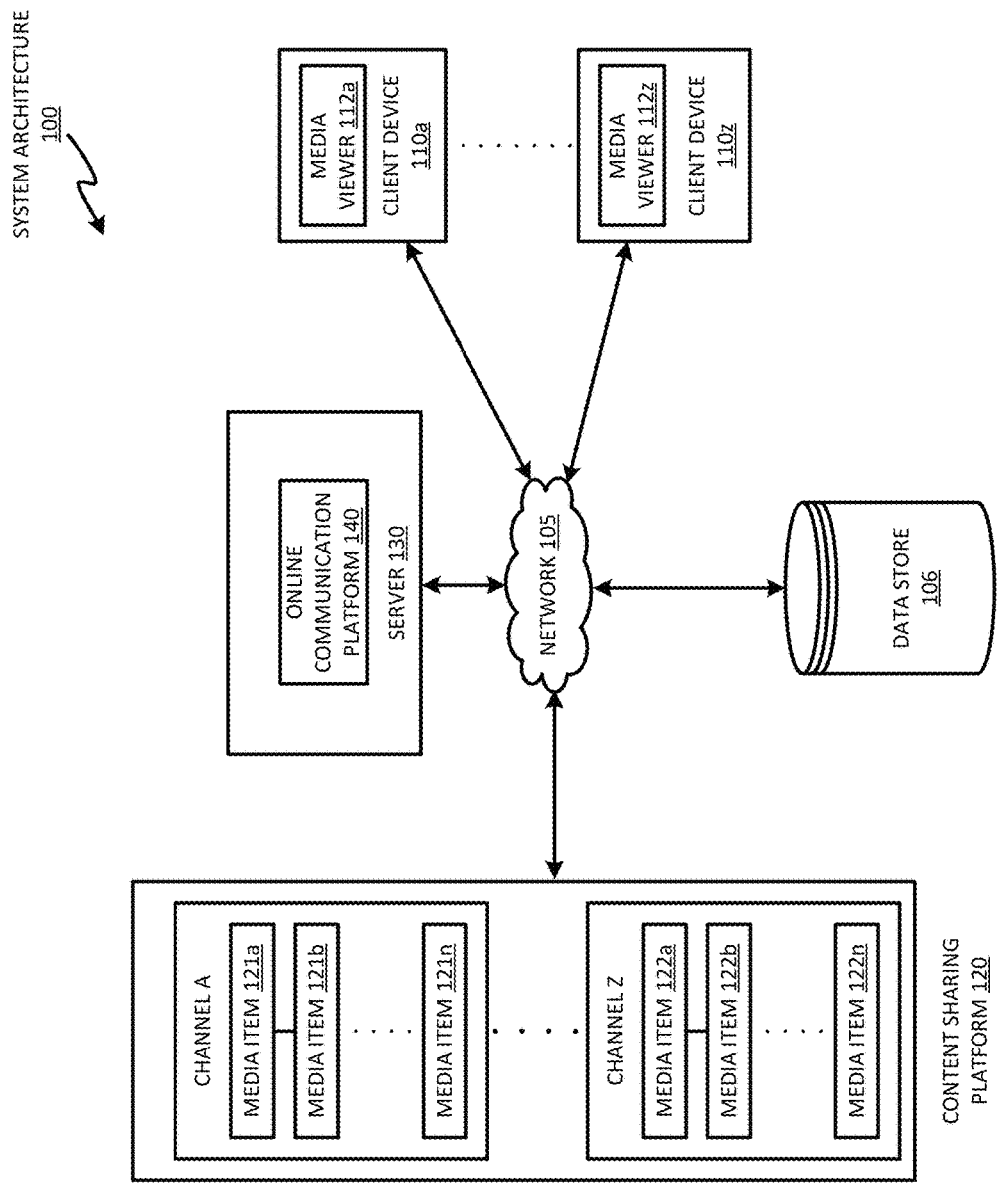
FIG. 1 is a block diagram illustrating an exemplary network architecture in which implementations of the present disclosure may be implemented.

Aspects of the disclosure are directed to providing an online engagement platform for content creators.

Many content creators typically develop an online presence beyond their primary social media platform which may be, for example, a video-based content sharing platform. For instance, content creators who primarily use a video-based content sharing platform may also interact with viewers on other social media platforms such as various social network platforms. Content creators usually use these types of secondary social media platforms to interact with viewers in ways that a video-based content sharing platform may not currently allow (e.g., initiating an online conversation with viewers of videos of a content creator). Furthermore, content creators who use social network platforms for such interactions may typically be subject to an overwhelming volume of comments and responses that are not of any interest to the content creators (spam responses).

Aspects of the present disclosure address the above and other deficiencies by supplementing a video-based content sharing platform with an online engagement platform that allows content creators (e.g., video channel owners) to engage in communication with their viewers on the video-based content sharing platform and to control how the viewers are permitted to interact with content posted by the content creator on the video-based content sharing platform. The operations described herein allow channel owners to structure viewer outreach and deliver it via posts through straightforward, task-oriented graphical user interfaces (GUIs) that are easy and enjoyable to use for both channel owners and channel content viewers. Posts by a channel owner can be made available to the public or limited to a defined group (e.g., recent channel subscribers, channel subscribers in New York, top commenters, etc.). Content creators may define permissive response types to control how a viewer is allowed to engage with a particular post, thereby avoiding spam responses and limiting the volume of comments.

In one example, a channel owner may wish to create a social post asking viewers to submit videos, which may be ranked by the viewers in a competition. The channel owner may, via a GUI on the content sharing platform, provide the posted content (e.g., the title of the post, the body of the post requesting the video submissions, any attachments to the post, etc.). The channel owner may also provide via the GUI a permissible response type for future responses to the posted content. In the present example, the channel owner may only allow viewers to submit video responses to the post. Furthermore, the channel owner may specify that viewers' responses may be limited to voting (e.g., up or down), without submitting comments.

Accordingly, aspects of the present disclosure provide a mechanism for supplementing content of channel owners with viewer engagement component that is easy, convenient and enjoyable to use for channel owners and channel content viewers. As a result, a content sharing platform is able to attract more video creators and more channel content viewers and is able to increase the amount of time that both channel owners and channel content viewers spend on the content sharing platform. In addition, by allowing channel owners to control what responses viewers are permitted to submit via the engagement component, aspects of the present disclosure avoid subjecting channel owners to unwanted responses (spam) and also limit the volume of comments received by the channel owners.

The present disclosure often references media items for simplicity and brevity. However, the teaching of the present disclosure can be applied to various types of content or media items, including for example, video, audio, text, images, program instructions, etc. The media items referred to herein represent viewable and/or shareable media items.

FIG. 1 illustrates an example system architecture 100 that includes client devices 110a through 110z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110a through 110z may each include computing devices such as personal computers (PCs), laptops, mobile phones, smart phones, tablet computers, network connected televisions, netbook computers etc. In some implementations, client device 110a through 110z may also be referred to as "user devices." Each client device includes a respective media viewer 112a-z. In one implementation, the media viewers 112a-z may be applications that allow users to view content, such as images, videos (e.g., video content items), web pages, documents, etc. For example, the media viewers 112a-z may be a web browser that can access, retrieve, present, and/or navigate content (e.g., web pages such as Hyper Text Markup Language (HTML) pages, digital media items or content items, etc.) served by a web server. The media viewers 112a-z may render, display, and/or present the content (e.g., a web page, a media viewer) to a user. The media viewers 112a-z may also display an embedded media player (e.g., a Flash® player or an HTML5 player) that is embedded in a web page (e.g., a web page that may provide information about a product sold by an online merchant). In another example, the media viewers 112a-z may be a standalone application that allows users to view digital media content items (e.g., digital videos, digital images, electronic books, etc.).

The media viewers 112a-z may be provided to the client devices 110a through 110z by the server 130 and/or content sharing platform 120. For example, the media viewers 112a-z may be embedded media players that are embedded in web pages provided by the content sharing platform 120. In another example, the media viewers 112a-z may be applications that communicate with the server 130.

In general, functions described in one implementation as being performed by the content sharing platform 120 can also be performed on the client devices 110a through 110z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide a user with access to media items (also referred to as content items) and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items.

In implementations of the disclosure, a "user," a "content creator" or a "channel owner" may be represented as a single individual. However, other implementations of the disclosure encompass a "user," a "content creator" or a "channel owner" being an entity controlled by a set of users and/or an automated source. For example, a set of individual users federated as a community in a social network may be considered a "user," a "content creator" or a "channel owner." In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121a-n and 122a-n (i.e., content items). Examples of media items 121a-n and 122a-n can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media items 121a-n and 122a-n are also referred to as a video content item.

Media items 121a-n and 122a-n may be consumed via the Internet and/or via a mobile device application. For brevity and simplicity, an online video (also hereinafter referred to as a video content item) is used as an example of a media items 121a-n and 122a-n throughout this document. As used herein, "media," media item," "online media item," "digital media," "digital media item," "content," "content item," and "video content item" can include an electronic file that can be executed or loaded using software, firmware or hardware configured to present the digital media item to an entity. In one implementation, the content sharing platform 120 may store the media items 121a-n and 122a-n using the data store 106.

In one implementation, the server 130 may be one or more computing devices (e.g., a rackmount server, a server computer, etc.). The server 130 may be included in the content sharing platform 120 or be part of a different system. The server 130 may host a online communication platform 140 that provides graphical user interfaces and operations to allow a channel owner to engage in communication with viewers of the channel of the channel owner. Further details with regard to the online communication platform 140 are disclosed below in conjunction with FIGS. 2 and 3.

Although implementations of the disclosure are discussed in terms of content sharing platforms and promoting social network sharing of a content item on the content sharing platform, implementations may also be generally applied to any type of social media platform providing connections between users. Such social media platforms are not limited to content sharing platforms that provide channel subscriptions to users and include social network platforms as well.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, a user's purchase transaction history, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 3:
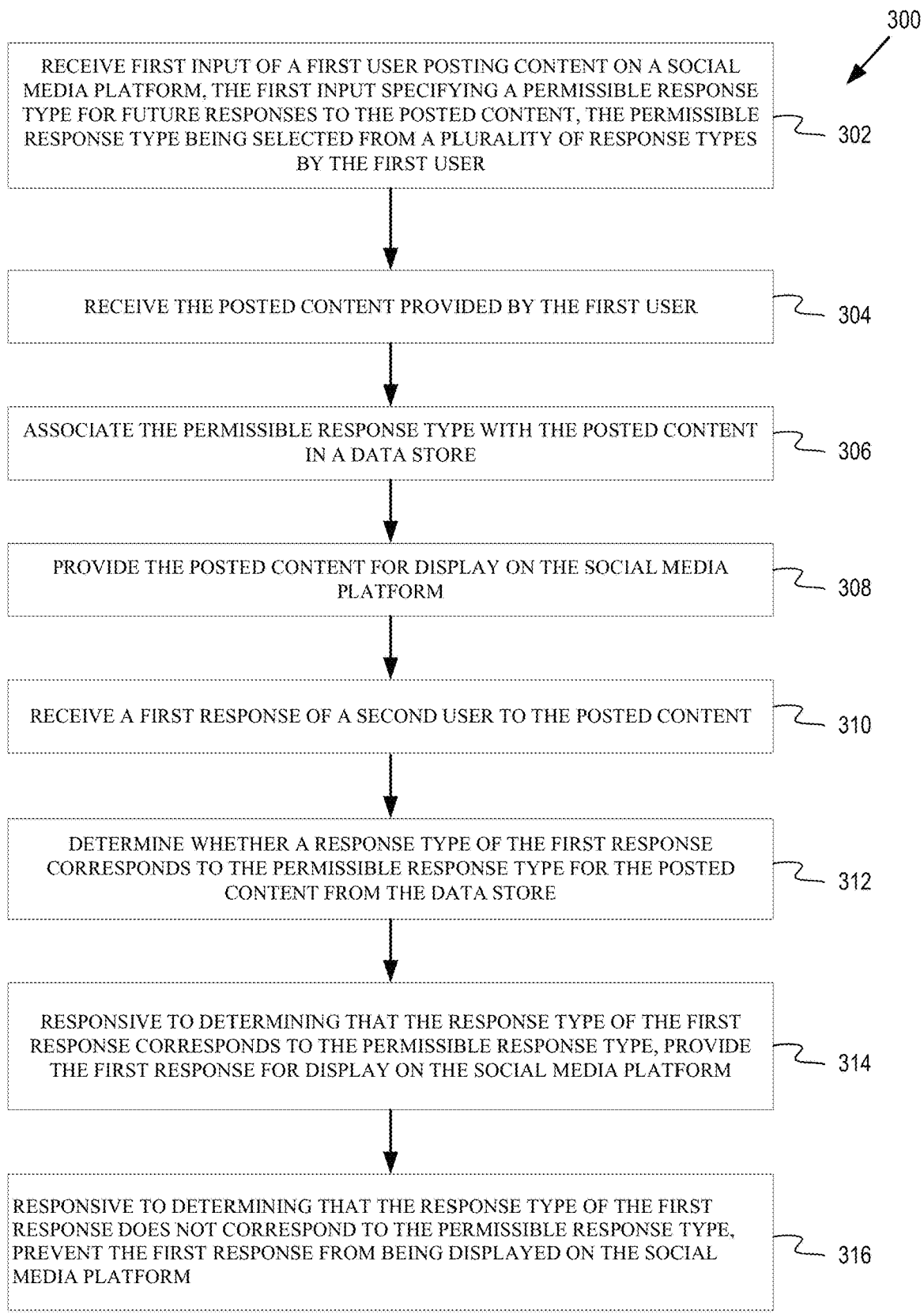
FIG. 3 is a flow diagram illustrating a method for managing responses to a post of a user of a social media platform, according to an implementation.
Figure 4:
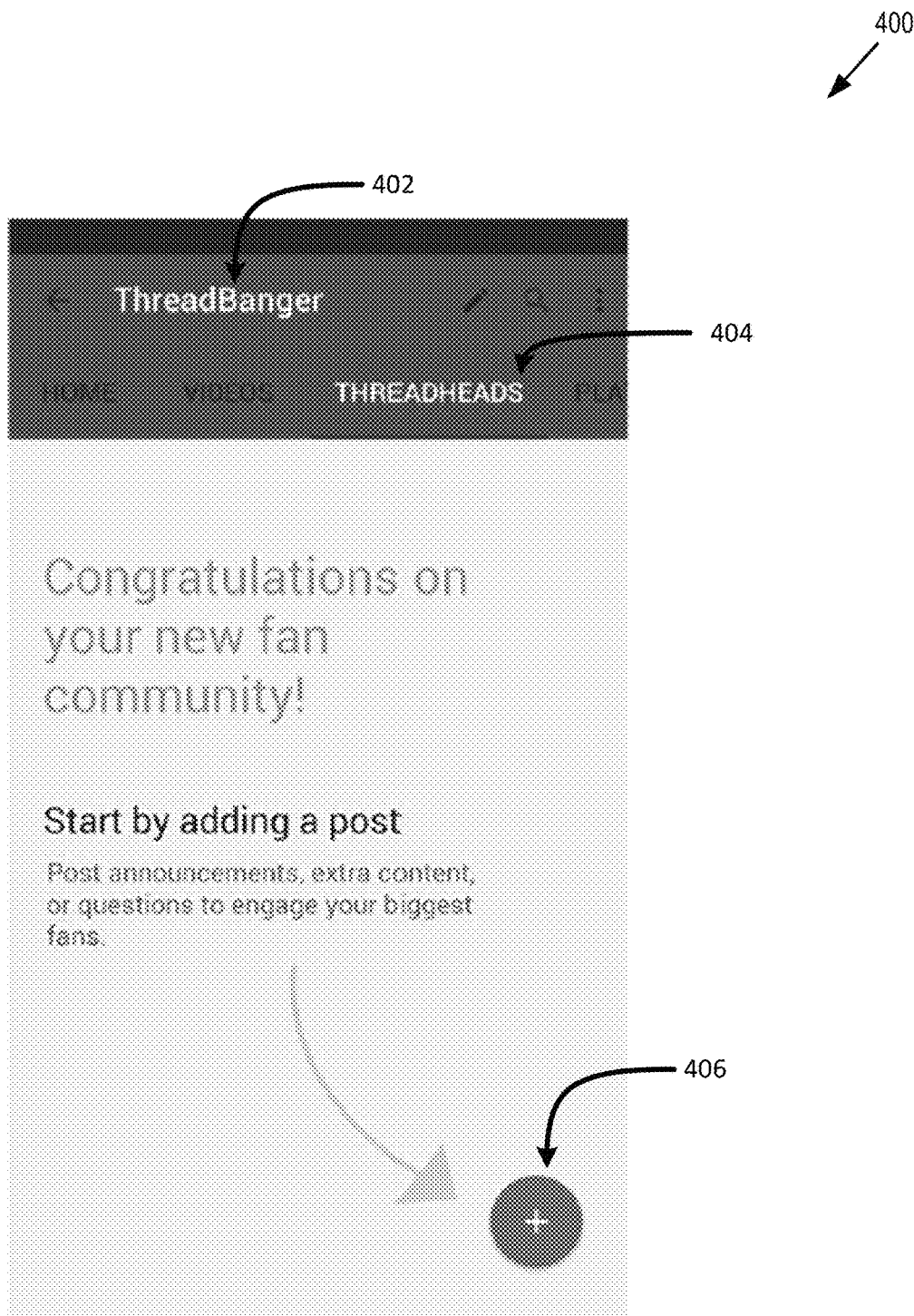
FIG. 4 illustrates an example channel graphical user interface in accordance with some aspects of the disclosure.

FIGS. 3-4 depict flow diagrams for illustrative examples of methods 300 and 400 for providing an online engagement platform. Methods 300 and 400 may be performed by processing devices that may include hardware (e.g., circuitry, dedicated logic), software (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Figure 2:
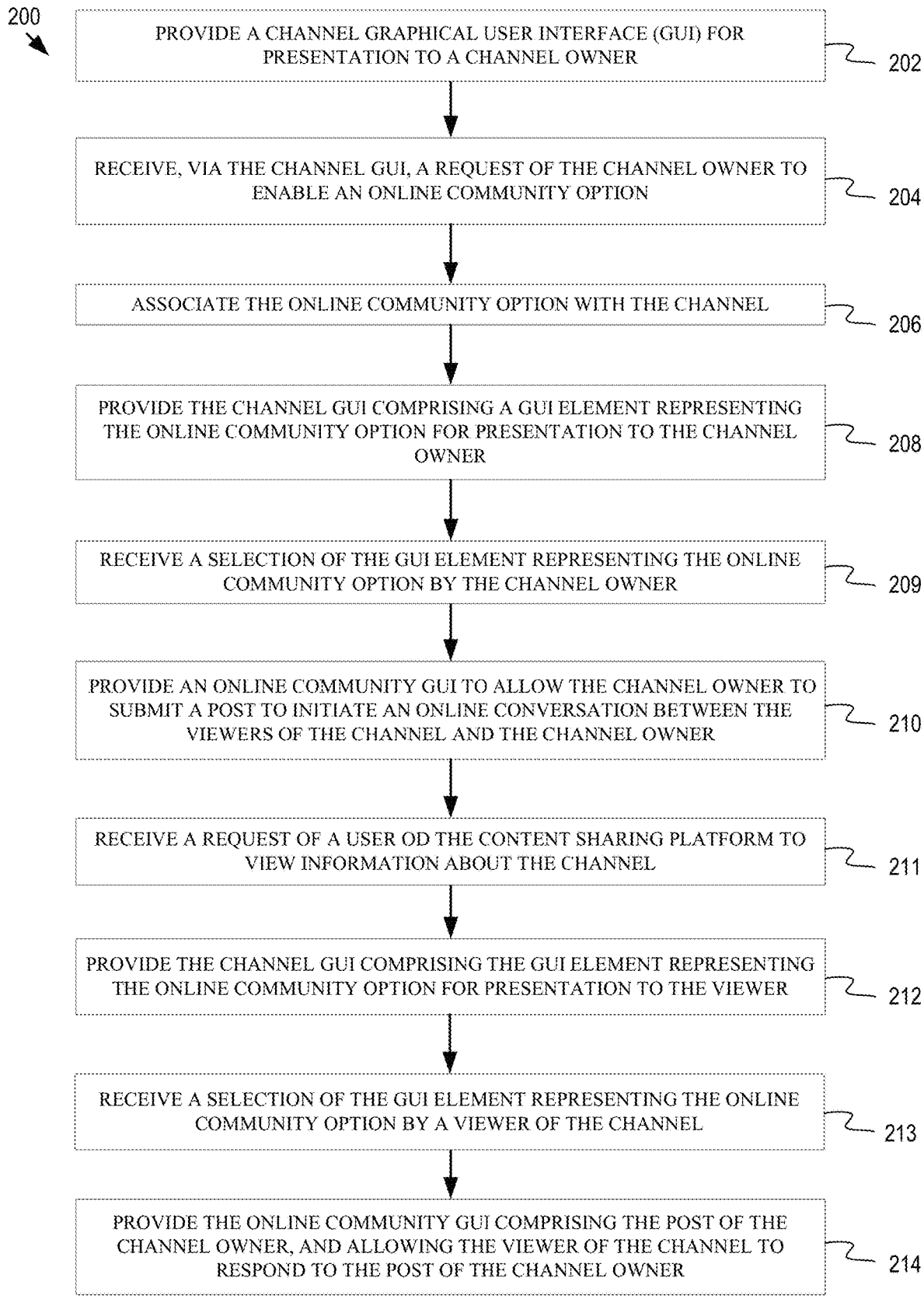
FIG. 2 is a flow diagram illustrating a method for providing an online engagement platform for content creators, according to an implementation.

FIG. 2 is a flow diagram illustrating a method 200 for providing an online engagement platform for content creators, according to an implementation. In one implementation, method 200 is performed by online communication platform 140 and/or content sharing platform 120 of FIG. 1.

Referring to FIG. 2, at block 202, processing logic provides a channel GUI for presentation to a channel owner. A channel owner may be a user of a content sharing platform who created a channel or is managing a channel on the content sharing platform. A channel owner may view the channel GUI via a client device (e.g., client device 110). In one implementation, the channel GUI allows the channel owner to perform various operations related to management of the channel of the channel owner. For example, the channel GUI may allow the channel owner to upload new media content items (e.g., videos, audios, etc.) to the channel, remove media content items from the channel, manage channel privacy settings, etc. In one implementation, the channel GUI may allow the channel owner to activate, via selectable GUI elements, various options that may be associated with the channel, including, for example, an option to enable an online community feature for the channel to allow communication between the channel owner and other users of the content sharing platform (e.g., viewers of the channel). Alternatively, an online community option can be enabled via a different user interface.

At block 204, processing logic receives, via the channel GUI, a request of the channel owner to enable the online community option. In one implementation, processing logic receives the request of the channel owner from a client device 110. The channel owner may initiate the request by activating (e.g., selecting) a designated GUI element of the channel GUI. In one implementation, the online community option is disabled for the channel by default, and is enabled upon some action performed by the channel owner. In another implementation, the online community option is enabled for the channel by default, and is disabled upon some action performed by the channel owner (e.g., via the GUI element of the channel GUI).

At block 206, upon the request of the channel owner to enable the online community option for the channel, processing logic may associate the online community option with the channel in a data store (e.g., data store 106 of FIG. 1). In one implementation, processing logic may perform the association in response to a verification that the online community option is available for the account associated with the channel owner. In one embodiment, the online community option is available for the account of the channel owner if the account is in good standing with the content sharing platform.

At block 208, processing logic provides the channel GUI comprising a GUI element representing the online community option for presentation to the channel owner (e.g., by updating the channel GUI upon receiving the request of the channel owner to enable the online community option). In one implementation, the GUI element representing the online community option does not appear on the channel GUI until the online community option has been associated with the channel in the data store. The GUI element may be a selectable link, icon or button on the channel GUI. In one implementation, the GUI element may be displayed as one of the tabs that allow a user to navigate through various GUIs pertaining to the channel.

At block 209, processing logic receives a selection of the GUI element representing the online community option by the channel owner. At block 210, in response to the selection of the GUI element representing the online community option by the channel owner, processing logic provides an online community GUI to allow the channel owner to submit a post to initiate an online conversation between the viewers of the channel and the channel owner. The online community GUI may be displayed, for example, in a pop-up window, a separate window. One example of an online community GUI is discussed in more detail below in conjunction with FIG. 4. A post may be an online communication that solicits viewers' responses. As will be discussed in more detail below, a post may be intended to initiate a poll, a discussion, a ranked submission, or the like. In one implementation, only channel owners may create posts in the online community GUI, and viewers may respond to the posts created by the channel owner. Alternatively, viewers may also create posts in the online community GUI associated with the channel owner.

In one implementation, to allow the channel owner to submit the post to initiate the online conversation between the viewers of the channel and the channel owner, processing logic may provide a post creation GUI to be presented to the channel owner. The post creation GUI may include a first GUI element (e.g., a text field) to receive the channel owner's input of a post title, a second GUI element (e.g., a text field) to receive the channel owner's input of a post body, and a third GUI element (e.g., a dropdown list) to receive the channel owner's input of a permissible response type. The post creation GUI may also include a fourth GUI element (e.g., a field) to receive the channel owner's input of a post attachment type. More detailed description of the various GUI elements is provided with respect to FIGS. 3-5.

Once the post is created, it can be viewed by other users of the content sharing platform. In particular, at block 211, processing logic may receive a request of a user of the content sharing platform to view information about the channel. In response, at block 212, processing logic provides the channel GUI that includes the GUI element representing the online community option for presentation to the user (referred to as a "viewer of the channel"). In one implementation, when the GUI element representing the online community option is associated with the channel in the data store, the GUI element is visible to the channel owner and all viewers of the channel. In another embodiment, the GUI element may be only visible to the channel owner until further action is taken by the channel owner to enable public visibility of the GUI element. In yet another embodiment, the GUI element is visible to the channel owner and a subset of viewers of the channel. For example, the GUI element may be visible to subscribers of the channel, and may not be visible to non-subscribers.

At block 213, processing logic receives a selection of the GUI element representing the online community option by the viewer of the channel. At block 214, in response to the selection of the GUI element representing the online community option by the viewer of the channel, processing logic provides the online community GUI including the post of the channel owner, and allows the viewer of the channel to respond to the post of the channel owner. In one implementation, the online community GUI presented to a viewer includes a feed of the posts created by the channel owner. The posts in the feed may be presented in a chronological order, a "post popular" order, or an order that places posts that have not yet been viewed in the most prominent position. In one implementation, the order of the posts is customizable by a viewer.

In one implementation, in response to receiving a response of the viewer to the post of the channel owner, processing logic may provide the response for display in the online community GUI. In another implementation, processing logic may provide the response for display in a private online community GUI viewable by the channel owner. Additional details describing posts and responses in the online community GUI are provided with respect to FIGS. 3-5.

It should be noted that although method 200 of FIG. 2 is discussed with reference to a channel owner and a channel GUI, method 200 can be similarly used for content creators such as video or audio creators. When used for video creators or audio creators, method 200 may integrate an online community option into a video GUI or an audio GUI respectively.

FIG. 3 is a flow diagram 300 illustrating a method for managing responses to a post of a user of a social media platform, according to an implementation. The social media platform may be, for example, a content sharing platform or a social network platform. A user may be a content (e.g., video) creator, a channel owner, or any other user of the social media platform. A post may be related to a video, channel or any other content or topic, and may be intended to solicit responses from content/channel viewers or any other users of the social media platform. In one example, method 300 is performed by online communication platform 140.

Referring to FIG. 3, at block 302, processing logic receives first input of a first user (e.g., a channel owner or video creator) posting content on a social media platform. The content may be posted via a post creation GUI on a client device of the first user (e.g., the post creation GUI described with respect to FIG. 2). In one implementation, the first input specifies a permissible response type for future responses to the posted content. The permissible response type may be selected from a plurality of response types by the first user. The plurality of response types may be defined by online communication platform 140.

A permissible response type determines in what form viewers are permitted to respond to posted content. A permissible response type may be "comment," which may indicate that a viewer is only allowed to submit text in response to a post unless the first user also allows other types of content to be provided with the comment. For example, the first user may specify that a response to the posted content be allowed to include a media content item (e.g., video, audio or image) with the comment. The first user may also specify whether the included media item should be hosted on the social media platform to be permissible. The first user may further specify whether links are permissible to include in a comment, and if so, what domains are permissible.

Other permissible response types may include: "poll," which dictates that only selection of a provided poll option is an allowed response type; and "media item," which dictates that users may submit a response that includes an image, video, GIF, etc., without additional text. The first user may dictate whether poll results should be displayed to responders either before or after a response is submitted or not at all.

Another permissible response type may be "ranked submission," which may dictate that users submit a response that will be subject to ranking (either up or down) by other users. The first user may specify whether any media item included in a ranked submission should be hosted on a social media account associated with the responder. Additional permissible response types may include, for example, multi-question quizzes, calendar events, and media purchasing (where a user may purchase a media item in response to a post). In one implementation, the first user may choose to not allow responses at all. Further, in some implementations, the first user may define (have control over) how responses should be displayed. For example, the first user may specify that a predefined number of responses should be displayed with the post, and that a selectable "see all responses" GUI element should be included to allow viewers to see more responses. In another example, the first user may specify that all received responses be displayed with the post.

At block 304, processing logic receives the posted content provided by the first user. The posted content may include a title of the post, a body of the post, and/or any attachments to the post. For example, the title of the post may be a short description of the post, to be displayed above the post. The body of the post may be the substance of the post and may include the content that the first user would like to share with viewers. For example, the body of the post may include a question to be posed to viewers, a statement, a request for responses, etc. The attachment may be a media item to be presented with the post. For example, the first user may attach a video or image to a post, and ask viewers to rate the video or image. The attachment may include a link to a media item or webpage to be provided with the post. Attachments may include linked videos to be displayed in-line with the body of the post. Alternatively, the first user can link to a gallery and choose a single media item from the gallery to be displayed with the post. In one embodiment, links over a threshold character count may be shortened to be displayed in the post. Attachments may be selected from media items already existing in a media library associated with the first user. Alternatively, the first user may upload a media item from the client device. The media item may be selected from a history of media items that have been viewed and/or liked by the first user.

At block 306, processing logic associates the permissible response type received at block 302 with the posted content in a data store (e.g., data store 106 of FIG. 1). In one implementation, the permissible response type and the posted content are associated by corresponding identifiers in the data store. The permissible response type and the posted content may share the same identifier. Alternatively, the permissible response type and the posted content may each have unique identifiers that are associated with each other.

At block 308, processing logic provides the posted content for display on the social media platform. The posted content may be visible to all users of the social media platform or a subset of the users. For example, the posted content may only be viewable by "subscribers"—viewers who "follow" the first user. Alternatively, the posted content may be viewable by any user of the social media platform. In another embodiment, the posts may be viewable by a group, but only a subset of that group may be able to interact with (e.g., respond to) the post. For example, all users of the social media platform may be able to view the post, but only subscribers may be able to respond to it.

In one implementation, subscribers may be able to view the post in various locations of the social media platform. For example, a subscriber may be provided a subscription feed, in which posts associated with various subscriptions are aggregated. In one implementation, posts may be sent only to users meeting defined characteristics. For example, posts may be sent to users based on geographical location, watch history, subscriber metrics (e.g., subscribers who have subscribed in the past X number of days), engagement metrics (e.g., subscribers who comment the most), special groups (e.g., subscribers who have a particular status), and mixed targeting (e.g., subscribers living in a certain region who have seen all the videos of the first user).

Furthermore, notifications may be sent to subscribers (e.g., from online communication platform 140 of FIG. 1) that have just subscribed, have not visited in a defined amount of time, and/or use notifications as a primary way to reach posts of the first user. A notification may be sent to subscribers who have not interacted with posted content in a defined amount of time (e.g., two weeks). The notification may allow the subscriber to affirm subscriber status or unfollow the first user. Furthermore, subscribers may be sent badges after sufficient engagement with posts of the first user.

In response to providing (making available) the posted content for display on the social media platform, processing logic may send a notification to a subset of users of the social media platform. The notification may indicate that the posted content can be viewed on the social network platform. Advantageously, this may allow for followers of the first user to have the first opportunity to view and respond to the posted content. In an implementation, where earlier responses are displayed above subsequent responses, the subset of viewers (e.g., the subscribers) will have the first opportunity to have the most prominently displayed response.

At block 310, processing logic receives a first response of a second user (e.g., a viewer) to the posted content. The response is associated with a response type. In one implementation, when the second user activates a GUI element on the online community GUI that indicates a desire to respond, a response GUI is provided that corresponds to the permissible response type. For example, if the permissible response type for posted content is "video only," processing logic may provide a video upload GUI for presentation to the user, where the video upload GUI does not include a GUI element (field) to submit text.

At block 312, processing logic determines whether a response type of the first response corresponds to the permissible response type for the posted content from the data store. In one implementation, processing logic may determine that the first response is associated with a particular post, determine the associated permissible response type of the post, and compare the permissible response type with the response type of the first response.

At block 314, responsive to determining that the response type of the first response corresponds to the permissible response type, processing logic provides the first response for display on the social media platform. In one implementation, the first response is privately displayed to an account associated with the first user. As discussed above, the first user may specify (e.g., via GUI 114 of FIG. 1) that responses to a particular post be private (responses should only be visible by the first user). Advantageously, this allows the first user to conduct private polls or rankings. Furthermore, statistics associated with the post and responses may be calculated and privately provided to the first user. Statistics may include: number of views, number of responses, number of subscriber responses and/or views, number of likes, etc. In another implementation, the first response may be publicly displayed to a plurality of users of the social media platform. The plurality of users of the social media platform may include all users of the social media platform or a select subset.

At block 316, in response to determining that the response type of the first response does not correspond to the permissible response type, processing logic prevents the first response from being displayed on the social media platform. Processing logic may additionally receive a second response of a third user to the posted content, determine whether a response type of the second response corresponds to the permissible response type for the posted content from the data store, and in response to determining that the response type of the second response corresponds to the permissible response type, providing the second response for display on the social media platform. In one implementation, the first response and the second response are displayed in a non-deterministic order. Advantageously, displaying responses in a nondeterministic order may be beneficial when asking for users to rank responses, so that the first response is not always at the top (and therefore most often seen). In another implementation, the responses are displayed in the order in which they are received. In yet another implementation, the responses are displayed in a ranked order (ranked either by the first user or the other users of the social media platform). In yet another implementation, the first user is able to "pin" his or her favorite responses to appear above the other responses.

FIG. 4 illustrates an example channel GUI 400 in accordance with some aspects of the disclosure. In one implementation, GUI 400 may be provided by online communication platform 140 of server 130 of FIG. 1. GUI 400 may be provided to client device 110 of a channel owner or another user. GUI 400 may display channel name 402 of the channel owner and a set of tabs, which may include a tab to access a channel home page GUI, a tab to access videos of the channel, and a community tab 404 (e.g., the online community option described with respect to FIG. 2. When a channel owner navigates to the community tab initially (e.g., before submitting a post), GUI 400 may display a selectable "add a post" GUI element 406, with instructions walking a channel owner through the creation of a first post. In some implementations, once a channel owner has already created a first post, GUI 400 may display a selectable GUI element to create a post without instructions describing the creation process. When a channel owner selects GUI element 406, a post creation GUI may be provided for display on client device 120 to allow the channel owner to create a post.

Figure 5:
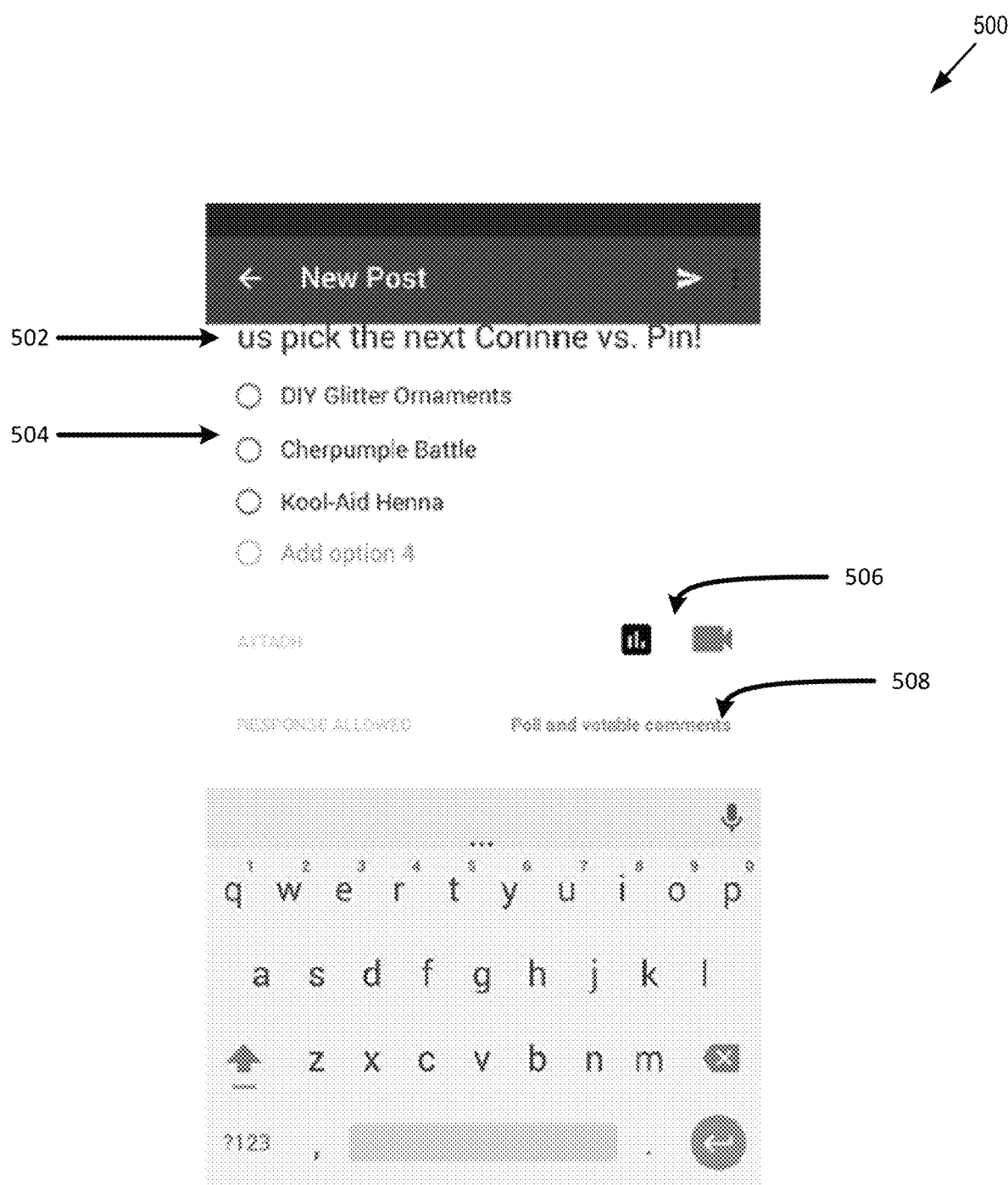
FIG. 5 illustrates an example post creation graphical user interface in accordance with some aspects of the disclosure.

FIG. 5 illustrates an example post creation GUI in accordance with some aspects of the disclosure. GUI 500 may allow, via various GUI elements, a user (e.g., a channel owner) to provide a post title, post body, post attachment, and a permissible response type, as described herein.

GUI 500 may include a field 502, in which a post title may be provided by a channel owner. The post title may be mandatory. The post title may be subject to a character maximum, and may optionally include hashtags. GUI 500 may include a field 504, in which a body of the post may be provided. In one implementation, field 504 may change depending on the permissible response type selected (e.g., via GUI element 508). For example, field 504 may provide for the input of text, checkboxes, radial buttons, hyperlinks, etc. GUI 500 may include GUI element 506, which allows for the input of an attachment to the post. Attachments may be images, videos, GIFS, locations and directions, hangout and/or group chat initiations, or other media items. GUI element 506 may provide for the upload of a media item itself or a link to where the media item currently resides.

GUI element 508 of GUI 500 may allow a channel owner to select, from a number of available options, a permissible response type for the post. In one implementation, the selected permissible response type determines in what form users may respond to the post. In one implementation, a single permissible response type may be selected from a number of available permissible response types. As described herein, the input provided via GUI 500 may be sent to a server for processing once submitted.

Figure 6:
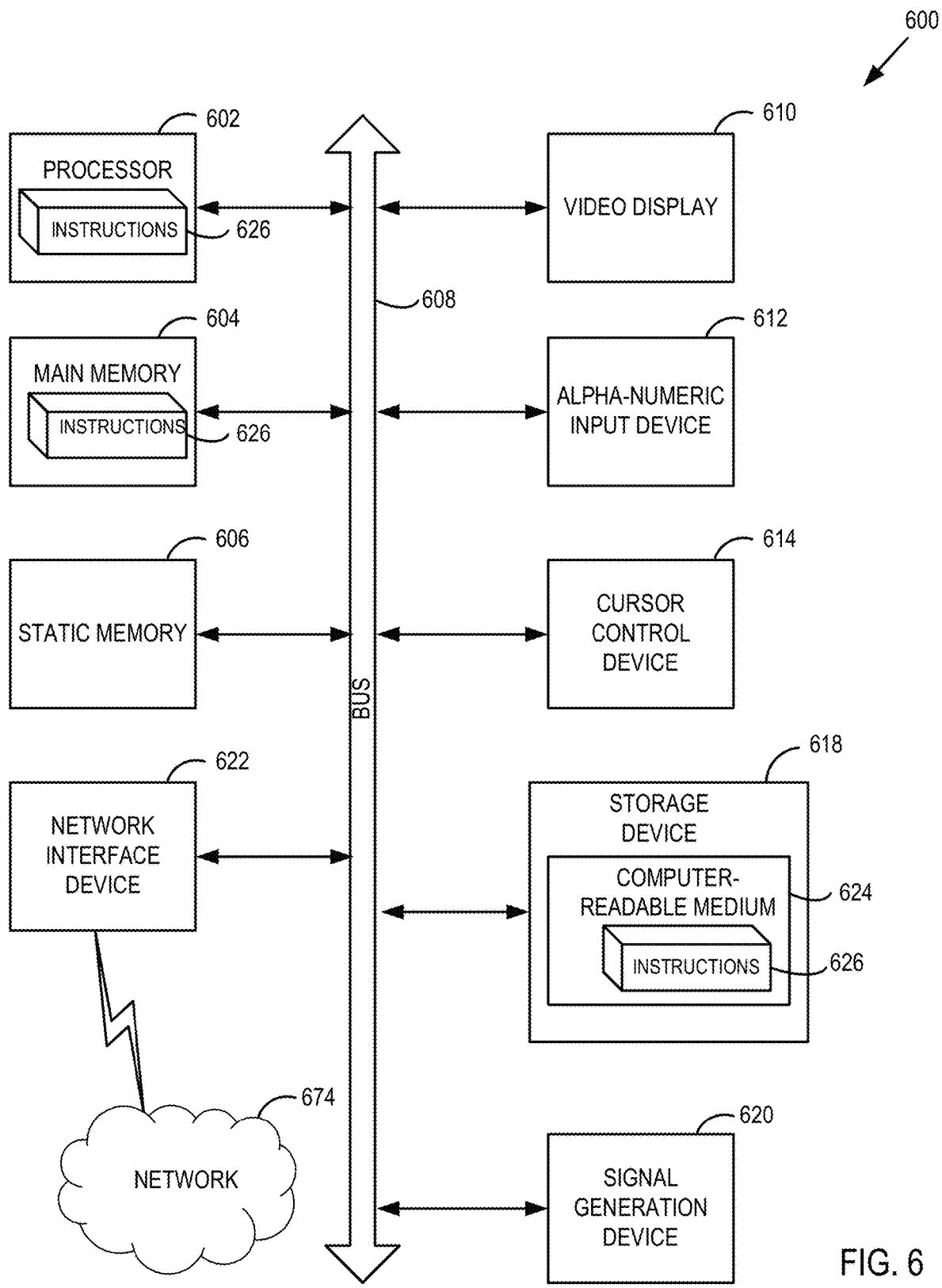
FIG. 6 is a block diagram illustrating an example computer system in which aspects of the disclosure can be implemented.

FIG. 6 illustrates a diagrammatic representation of a machine in the exemplary form of a computer system 600 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a network connected television, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 600 may be representative of a server, such as server 130, executing online communication platform 140, as described with respect to FIGS. 1-5. In another implementation, computer system 600 may be representative of a client device, such as client device 110, executing a social media platform and GUI 114, as described with respect to FIGS. 1-5.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 608. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 618 may include a computer-readable storage medium 624 (also referred to as a machine-readable storage medium), on which is stored one or more set of instructions 626 (e.g., software) embodying any one or more of the methodologies of functions described herein. The instructions 626 may also reside, completely or at least partially, within the main memory 604 and/or within the processing device 602 during execution thereof by the computer system 600; the main memory 604 and the processing device 602 also constituting machine-readable storage media. The instructions 626 may further be transmitted or received over a network 674 via the network interface device 622.

The computer-readable storage medium 624 may also be used to store instructions to perform a method for control over response types in an online engagement platform, as described herein. While the computer-readable storage medium 624 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method, comprising:
providing, by a processing device of a content sharing platform, a channel graphical user interface (GUI) for presentation to a channel owner, the channel GUI comprising GUI elements that represent channel management options allowing the channel owner to perform operations related to management of a channel of the channel owner, the channel comprising a plurality of content items, the channel management options comprising uploading new content items to the channel and removing existing content items from the channel;
receiving, via the channel GUI, a request of a channel owner to enable an online community option that (i) facilitates an online conversation between the channel owner and a subset of viewers of the channel of the channel owner on the content sharing platform, and (ii) allows the channel owner to control viewer responses that are permitted during the online conversation;
in response to the request of the channel owner to enable the online community option:
associating the online community option with the channel in a data store; and
modifying the channel GUI for presentation of a modified channel GUI to the channel owner, the modified channel GUI presenting an online community GUI element representing the online community option together with the GUI elements representing the channel management options comprising uploading the new content items to the channel and removing the existing content items from the channel;
upon a selection of the online community GUI element representing the online community option in the modified channel GUI by the channel owner, providing a post creation GUI to allow the channel owner to submit a post to initiate the online conversation between the subset of viewers and the channel owner, the post creation GUI comprising one or more post GUI elements to receive a title of the post and a body of the post, and a response GUI element to receive permissible viewer responses;
providing the channel GUI comprising the GUI element representing the online community option for presentation to a viewer of the viewers of the channel; and
in response to a selection of the GUI element representing the online community option by the viewer of the channel in the channel GUI, providing the online community GUI comprising the title and the body of the post of the channel owner, and allowing the viewer of the channel to provide a permissible viewer response to the post of the channel owner.

2. The method of claim 1, further comprising:
receiving the permissible viewer response of the viewer to the post of the channel owner; and
providing the response for display to the channel owner but not other viewers.

3. The method of claim 1, wherein the post creation GUI further comprises a post attachment GUI element to receive input of a post attachment type.

4. The method of claim 1, further comprising:
receiving the permissible viewer response of the viewer to the post of the channel owner; and
providing the response for display to the subset of viewers and the channel owner.

5. The method of claim 1, wherein the permissible user responses correspond to one or more permissible response types.

6. The method of claim 5, further comprising:
associating the one or more permissible response types with the post in the data store;
receiving a first response of the viewer to the post;
determining, by the processing device, whether a response type of the first response corresponds to the one or more permissible response types for the posted content from the data store;
responsive to determining that the response type of the first response corresponds to the one or more permissible response types, providing, by the processing device, the first response for display on the content sharing platform; and
responsive to determining that the response type of the first response does not correspond to the one or more permissible response types, preventing, by the processing device, the first response from being displayed on the content sharing platform.

7. The method of claim 6, wherein providing the online community GUI comprising the post of the channel owner comprises sending a notification to the subset of viewers of the channel, the notification identifying the posted content.

8. The method of claim 6, further comprising:
receiving a second response of a second viewer to the post;
determining whether a response type of the second response corresponds to the one or more permissible response types for the post from the data store; and
in response to determining that the response type of the second response corresponds to the one or more permissible response type, providing the second response for display on the content sharing platform, wherein the first response and the second response are displayed in a nondeterministic order.

9. The method of claim 6, wherein the post content comprises a link to a media item to be provided with the post.

10. A system comprising:
a memory; and
a processing device, coupled to the memory, to perform operations comprising:
providing a channel graphical user interface (GUI) of a content sharing platform for presentation to a channel owner, the channel GUI comprising GUI elements that represent channel management options allowing the channel owner to perform operations related to management of a channel of the channel owner, the channel comprising a plurality of content items, the channel management options comprising uploading new content items to the channel and removing existing content items from the channel;
receiving, via the channel GUI, a request of a channel owner to enable an online community option that (i) facilitates an online conversation between the channel owner and a subset of viewers of the channel of the channel owner on the content sharing platform, and (ii) allows the channel owner to control viewer responses that are permitted during the online conversation;
in response to the request of the channel owner to enable the online community option:
associating the online community option with the channel in a data store; and
modifying the channel GUI for presentation of a modified channel GUI to the channel owner, the modified channel GUI presenting an online community GUI element representing the online community option together with the GUI elements representing the channel management options comprising uploading the new content items to the channel and removing the existing content items from the channel;
upon a selection of the online community GUI element representing the online community option in the modified channel GUI by the channel owner, providing a post creation GUI to allow the channel owner to submit a post to initiate the online conversation between the subset of viewers and the channel owner, the post creation GUI comprising one or more post GUI elements to receive a title of the post and a body of the post, and a response GUI element to receive permissible viewer responses;
providing the channel GUI comprising the GUI element representing the online community option for presentation to a viewer of the viewers of the channel; and
in response to a selection of the GUI element representing the online community option by the viewer of the channel in the channel GUI, providing the online community GUI comprising the title and the body of the post of the channel owner, and allowing the viewer of the channel to provide a permissible viewer response to the post of the channel owner.

11. The system of claim 10, wherein the operations further comprise:
receiving the permissible viewer response of the viewer to the post of the channel owner; and
providing the response for display to the channel owner but not other viewers.

12. The system of claim 10, wherein the post creation GUI further comprises a post attachment GUI element to receive input of a post attachment type.

13. The system of claim 10, wherein the operations further comprise:
receiving the permissible viewer response of the viewer to the post of the channel owner; and
providing the response for display to the subset of viewers and the channel owner.

14. The system of claim 10, wherein the permissible user responses correspond to one or more permissible response types.

15. The system of claim 14, wherein the operations further comprise:
associating the one or more permissible response types with the post in the data store;
receiving a first response of the viewer to the post;
determining whether a response type of the first response corresponds to the one or more permissible response types for the posted content from the data store;
responsive to determining that the response type of the first response corresponds to the one or more permissible response types, providing the first response for display on the content sharing platform; and
responsive to determining that the response type of the first response does not correspond to the one or more permissible response types, preventing the first response from being displayed on the content sharing platform.

16. The system of claim 15, wherein providing the online community GUI comprising the post of the channel owner comprises sending a notification to the subset of viewers of the channel, the notification identifying the posted content.

17. The system of claim 16, wherein the operations further comprise:
receiving a second response of a second viewer to the post;
determining whether a response type of the second response corresponds to the one or more permissible response types for the post from the data store; and
in response to determining that the response type of the second response corresponds to the one or more permissible response type, providing the second response for display on the content sharing platform, wherein the first response and the second response are displayed in a nondeterministic order.

18. The system of claim 16, wherein the post content comprises a link to a media item to be provided with the post.

19. A non-transitory machine-readable storage medium storing instructions which, when executed, cause a processing device to perform operations comprising:
providing a channel graphical user interface (GUI) of a content sharing platform for presentation to a channel owner, the channel GUI comprising GUI elements that represent channel management options allowing the channel owner to perform operations related to management of a channel of the channel owner, the channel comprising a plurality of content items, the channel management options comprising uploading new content items to the channel and removing existing content items from the channel;

receiving, via the channel GUI, a request of a channel owner to enable an online community option that (i) facilitates an online conversation between the channel owner and a subset of viewers of the channel of the channel owner on the content sharing platform, and (ii) allows the channel owner to control viewer responses that are permitted during the online conversation;

in response to the request of the channel owner to enable the online community option:

associating the online community option with the channel in a data store; and modifying the channel GUI for presentation of a modified channel GUI to the channel owner, the modified channel GUI presenting an online community GUI element representing the online community option together with the GUI elements representing the channel management options comprising uploading the new content items to the channel and removing the existing content items from the channel;

upon a selection of the online community GUI element representing the online community option in the modified channel GUI by the channel owner, providing a post creation GUI to allow the channel owner to submit a post to initiate the online conversation between the subset of viewers and the channel owner, the post creation GUI comprising one or more post GUI elements to receive a title of the post and a body of the post, and a response GUI element to receive permissible viewer responses;

providing the channel GUI comprising the GUI element representing the online community option for presentation to a viewer of the viewers of the channel; and in response to a selection of the GUI element representing the online community option by the viewer of the channel in the channel GUI, providing the online community GUI comprising the title and the body of the post of the channel owner, and allowing the viewer of the channel to provide a permissible viewer response to the post of the channel owner.

20. The non-transitory machine-readable storage medium of claim 19, wherein the operations further comprise:

receiving the permissible viewer response of the viewer to the post of the channel owner; and providing the response for display to the subset of viewers and the channel owner.

21. The non-transitory machine-readable storage medium of claim 19, wherein the post creation GUI further comprises a post attachment GUI element to receive input of a post attachment type.

22. The non-transitory machine-readable storage medium of claim 19, wherein the permissible user responses correspond to one or more permissible response types.

23. The non-transitory machine-readable storage medium of claim 22, wherein the operations further comprise:

associating the one or more permissible response types with the post in the data store;

receiving a first response of the viewer to the post;

determining whether a response type of the first response corresponds to the one or more permissible response types for the posted content from the data store;

responsive to determining that the response type of the first response corresponds to the one or more permissible response types, providing the first response for display on the content sharing platform; and responsive to determining that the response type of the first response does not correspond to the one or more permissible response types, preventing the first response from being displayed on the content sharing platform.

* * * * *